United States Patent Office 3,546,211
Patented Dec. 8, 1970

3,546,211
POLYCYCLIC β-LACTAMS
Ajay K. Bose, Mountain Lakes, N.J., assignor to Research Corporation, New York, N.Y., a nonprofit corporation of New York
No Drawing. Filed June 22, 1967, Ser. No. 647,921
Int. Cl. C07d 25/02, 91/18, 93/08
U.S. Cl. 260—239          2 Claims

ABSTRACT OF THE DISCLOSURE

Polycyclic β-lactams active as anti-inflammatory agents are prepared by the condensation of azidoacetyl chloride with a cyclic imine.

---

This invention relates to a method for the synthesis of polycyclic β-lactam compounds and to the novel compounds thereby produced.

The chemistry of β-lactams has been extensively studied in recent years mainly because of the presence of the β-lactam ring in penicillin and cephalosporin related compounds. The availability of 6-aminopenicillanic acid as a biosynthetic product has led to the preparation of several medicinally useful semi-synthetic penicillins with various amide side-chains at C(6). The general synthesis of penicillin devised by Sheehan and Henery-Logan can be used for the preparation of various modified penicillin compounds but not with a substituent at C(5). Sheehan et al. had previously prepared 5-phenylpenicillanic acid derivatives with the phthalimido or the succinimido group at C(6) but these compounds could not be converted into the corresponding free amine without scission of the β-lactam ring.

The present invention is based on the discovery of a new synthetic approach to the preparation of β-lactam compounds. The method of the present invention is particularly suited to the preparation of 5-phenylpenicillanic acids and 6-phenylcephams capable of further conversion into penicillin and cephalosporin-like compounds.

It is, therefore, a principal object of the present invention to provide a new method for the preparation of β-lactam compounds.

It is a further object of the invention to provide novel penicillin-like, cephalosporin-like, and other β-lactam compounds of pharmacological interest.

The present invention is a method for the preparation of polycyclic β-lactam compounds which comprises reacting azidoacetyl chloride with a cyclic imine in the presence of an organic base, and the compounds thereby produced. These compounds, on the basis of standard foot edema assay evaluation tests on representative compounds, have been found to be active as anti-inflammatory agents.

The β-lactam compounds of the present invention are prepared starting with the ring-forming condensation of azido-acetyl chloride with a cyclic imine. The term imine as used herein refers to a compound characterized by the presence of a

grouping. Two of the indicated three valences must be present as part of a cyclic structure, i.e., the C and the N may be joined by a grouping that forms a heterocyclic ring or the C may be part of a carbocyclic ring. The reaction is effected in the presence of an organic base, preferably a tertiary amine such as a trialkylamine or pyridine, and usually in the presence of an inert solvent, i.e., a solvent unreactive in the presence of the reactants under reaction conditions. Conventional hydrocarbon and halogenated hydrocarbon solvents are particularly suitable for use in this system. The ring forming condensations are illustrated as follows:

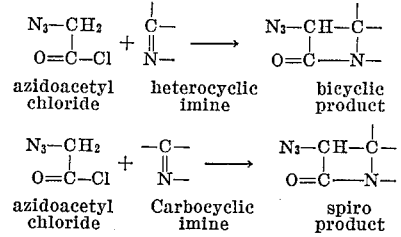

Catalytic reduction of the resultant azides, as with hydrogen in the presence of Adam's catalyst, yields the corresponding amine compounds. Acylation of the amines, as with an acyl halide, yields the corresponding acylamines or amides.

The spiro compounds of the present invention are of the general formula:

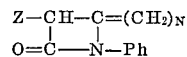

wherein Z represents azido, amino ar acylamino, Ph represents phenyl or substituted phenyl, and $n$ is an integer from 4–6 inclusive. Substituted phenyl includes such groups as nitrophenyl, halophenyl, e.g., chlorophenyl and bromophenyl, lower-alkoxy phenyl, e.g., anisyl, lower-alkyl phenyl, e.g., tolyl, and the like bearing noninterfering substituents known to those skilled in the art of chemistry.

The penicillin related compounds of the present invention are of the general formula:

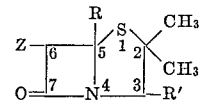

wherein Z represents azido, amino or acylamino; R represents phenyl or lower-alkanoyloxy; and R' represents hydrogen or lower-alkanoyloxy when R is phenyl. As used herein, lower-alkanoyloxy refers to acyl groups of the formula $C_nH_{2n+1}$ wherein $n$ is an integer having the values 1 through 6 inclusive and phenyl is as described above.

The cephalosporin related compounds of the present invention are of the general formula:

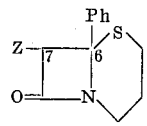

wherein Z and Ph have the values described above. The name cepham has been assigned to this nucleus.

The invention is further described by means of the illustrative examples which follow:

EXAMPLE 1

Methyl 6-azido-5-phenylpenicillinate

A solution of 1.11 g. of triethylamine in 50 ml. of methylene chloride was added dropwise to a refluxing solution of 2.5 g. of methyl 5,5-dimethyl-2-phenyl-2-thiazoline-4-carboxylate and 1.32 g. of azidoacetyl chloride in 70 ml. of methylene chloride. After the reaction was completed, methylene chloride was removed under reduced pressure, the residue dried, extracted with ether, and the ether extract washed with water. The ether layer was dried over anhydrous magnesium sulfate, and the solvent evaporated. The 3.3 g. of brown residue obtained was chromatographed on a silica gel column and eluted with methylene chloride. The 0.78 g. of azide product was crystallized from ethanol and melted 95–7° C.

Calcd. for $C_{15}H_{16}O_3N_4S$ (percent): C, 54.22; H, 4.85; N, 16.86. Found (percent): C, 54.06; H, 4.95; N, 16.80.

The corresponding ethyl ester was made using ethyl 5,5-dimethyl-3-phenyl-3-thiazoline-4-carboxylate in place of the methyl ester reactant.

EXAMPLE 2

Methyl 6-amino-5-phenylpenicillinate

A solution of 503 mg. of azido product from the previous example in 40 ml. of ethyl acetate containing 175 mg. of Adam's catalyst was shaken for 6 hrs. with hydrogen at a pressure of 40 p.s.i. The yield of amine product was 444 mg. after catalyst removal and evaporation of the solvent.

EXAMPLE 3

Methyl 6-phenacetylamino-5-phenylpenicillinate

To an ice-cold solution of 444 mg. of the amine from the previous example and 0.22 ml. of triethylamine in 10 ml. benzene there was added with constant stirring a solution of 230 mg. of phenacetyl chloride in 3 ml. of benzene. Stirring was continued at room temperature for an additional 2 hrs. The precipitated triethylamine hydrochloride was filtered off and solvent evaporated from the filtrate. The resultant gummy residue was triturated with hexane to give a white solid. After crystallization of the solid from benzene-hexane, there was obtained 310 mg. of amide product, M.P. 127–9° C.

Calcd. for $C_{23}H_{26}N_2O_4S$ (percent): C, 65.08; H, 5.70; N, 6.60. Found (percent): C, 65.29; H, 5.76; N, 6.69.

EXAMPLE 4 t-butyl 1-aza-3,3-dimethyl-7-oxo-6-azido-4-thiabicyclo[3.2.0]heptane-5-carboxylate Using the method of Example 1, the azido product was prepared by the reaction of azidoacetyl chloride with t-butyl 5,5-dimethyl-2-thiazoline-2-carboxylate.

EXAMPLE 5 t-butyl 1-aza-3,3-dimethyl-7-oxo-6-phenoxyacetamido-4-thiabicyclo[3.2.0]heptane-5-carboxylate The azido product of the previous example was reduced to the amine as in Example 2 and acylated with phenoxyacetyl chloride using the method of Example 3.

EXAMPLE 6

2-(p-nitrophenyl)-5,6-dihydro-1,3-thiazine

A solution of 5 g. of 3-hydroxypropyl-p-nitrobenzamide in 50 ml. of xylene was refluxed for 1½ hrs. with 3 g. of phosphorus pentasulfide. The xylene layer was decanted off and the dark residue washed twice with ether. The residue was triturated with about 25 ml. of 10% aqueous sodium hydroxide and extracted with benzene. The combined organic extracts (xylene, ether and benzene) were washed with 10% aqueous sodium hydroxide and then with water. The solvent was evaporated after drying the organic layer over anhydrous magnesium sulfate. Crystallization of the residue from hexane gave 1.5 g. of the thiazine product as shining yellow plates, M.P. 128–130° C.

EXAMPLE 7

7-azido-6-(p-nitrophenyl) cepham

To a solution of 1.45 g. of azidoacetyl chloride in 200 ml. of dry methylene chloride there was added at room temperature 2.79 g. of 2-(p-nitrophenyl)-5,6-dihydro-1,3-thiazine in 40 ml. of methylene chloride. A solution of 1.68 ml. of triethylamine in 60 ml. of methylene chloride was then added dropwise at 5–15° C. over a period of one hour and the reaction mixture stirred for an additional hour at room temperature. The reaction mixture was then washed successively with water, 2 N hydrochloric acid and water, and dried over anhydrous magnesium sulfate. The 3.1 g. residue left on evaporation of the solvent was dried in vacuum and crystallized from ethyl alcohol. The azido product was obtained as 1.75 g. of yellow prisms, M.P. (dec.) 125–6° C.

EXAMPLE 8

7-azido-6-phenylcepham

The analogous unsubstituted phenyl compound was prepared and purified using the same general method as in the previous example but starting with 2-phenyl-5,6-dihydro-1,3-thiazine in place of the nitrophenyl reactant. The product may also be designated as 7-azido-6-phenyl-5-thia-1-azabicyclo[4.2.0]octan-8-one.

EXAMPLE 9

7-phenoxyacetamido-6-phenylcepham

The azido compound of the previous example was reduced to the amine by the method of Example 2 and acylated with phenoxyacetyl chloride using the method of Example 3. The product may be named as a cepham or by using the bicyclo system shown in the previous example.

EXAMPLE 10

1-phenyl-3-azido-4,4-spirocyclo hexaneazetid-2-one

The spiro azide product was prepared by the reaction of azidoacetyl chloride and N-phenylcyclohexylimine using the procedure of Example 1 and melted 84–86° C.

EXAMPLE 11

1-phenyl-3-phenoxyacetamido-4,4-spirocyclohexane-azetid-2-one

The azide product of the previous example was reduced to the amine by the method of Example 2 and acylated with phenoxyacetyl chloride using the procedure of Example 3. The amido product, which may also be named N-(1-aza-2-oxospirol[3.5]non-3-yl) phenoxyacetamide, melted 145–146° C.

EXAMPLE 12

To a solution of 4.2 ml. of triethylamine and 9.36 g. of 1-(-p-nitrophenyl)-6,7-dimethoxy - 3,4 - dihydroisoquinoline prepared by the method of S. Rajgopalan and K. Ganapathi, Proc. Indian Acad. Sci., 15A, 432 (1942) and dissolved in 200 ml. of methylene chloride, there was added dropwise with constant stirring a solution of 3.6 g. of azidoacetyl chloride in 40 ml. of methylene chloride. Stirring was continued for an additional 1½ hours. The reaction mixture was washed with water, dried over anhydrous magnesium sulfate and the solvent evaporated. The orange residue was triturated with 50 ml. of ethanol and the resultant yellow solid crystallized from ethanol to yield 8.2 g. of the tricyclic azide product having the structural formula:

Calcd. for $C_{19}H_{17}N_5O_5$ (percent): C, 57.72; H, 4.33; N, 17.72. Found (percent): C, 57.35; H, 4.73; N, 17.56.

Other variations of the present preparative method falling within the scope of the present invention will suggest themselves to those skilled in the art; the invention is as claimed.

The work on which this application was based was finaced in whole or in part by the Public Health Service.

I claim:

1. A compound of the formula:

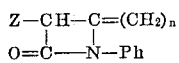

wherein Z is azido, amino or phenoxyacetamido, Ph is phenyl, nitrophenyl, halophenyl, lower-alkoxy phenyl or lower-alkyl phenyl, and $n$ is an integer from 4–6 inclusive.

2. A compound according to claim 1 wherein Z is phenoxyacetamido, Ph is phenyl, and $n$ is 5.

References Cited

UNITED STATES PATENTS 3,194,801  7/1965  Perleman _____ 260—239

ALTON D. ROLLINS, Primary Examiner

U.S. Cl. X.R.

260—239.1, 243, 288, 289, 306.7, 349, 558, 999